United States Patent
Gupta et al.

(10) Patent No.: US 9,686,048 B2
(45) Date of Patent: Jun. 20, 2017

(54) DELAYED AUTOMATIC REPEAT REQUEST (ARQ) ACKNOWLEDGMENT

(75) Inventors: Vikram Gupta, San Diego, CA (US); Rashid A. Attar, San Diego, CA (US); Yu-Cheun Jou, San Diego, CA (US); Ravindra Manohar Patwardhan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 466 days.

(21) Appl. No.: 13/009,713

(22) Filed: Jan. 19, 2011

(65) Prior Publication Data
US 2011/0243067 A1 Oct. 6, 2011

Related U.S. Application Data

(60) Provisional application No. 61/321,496, filed on Apr. 6, 2010.

(51) Int. Cl.
*H04L 1/18* (2006.01)

(52) U.S. Cl.
CPC ............ *H04L 1/1854* (2013.01); *H04L 1/189* (2013.01); *H04L 1/1887* (2013.01)

(58) Field of Classification Search
USPC ....................................................... 370/328
See application file for complete search history.

(56) References Cited

U.S. PATENT DOCUMENTS

2004/0114598 A1    6/2004 Veerepalli et al.
2007/0263631 A1*   11/2007 Mallory ............... H04L 1/1635
                                                            370/394
2009/0232052 A1    9/2009 Black et al.
(Continued)

FOREIGN PATENT DOCUMENTS

CN        1723278 A       1/2006
JP      H09116597 A       5/1997
(Continued)

OTHER PUBLICATIONS

International Search Report and Written Opinion—PCT/US2011/031461, ISA/EPO—Jul. 4, 2011.
Taiwan Search Report—TW100111871—TIPO—Dec. 24, 2013.

*Primary Examiner* — Sulaiman Nooristany
(74) *Attorney, Agent, or Firm* — Larry J. Moskowitz

(57) ABSTRACT

Disclosed are examples in which the acknowledgement channel is used for retransmitting a frame received with error. A receiver is configured to transmit an acknowledgment for a frame when the frame is decoded following receipt of the last Pilot Control Group (PCG) of the same frame. The transmitter is configured to receive the acknowledgment of an earlier frame during a subsequent frame, and not to retransmit the earlier frame. The two frames may be adjacent. During connection setup negotiation, the system can determine the values of ack_mask1 defining allowed times for the receiver to acknowledge successful decoding of the subsequent frame, and ack_mask2 defining allowed times for the receiver to acknowledge successful decoding of the earlier frame. The two mask values provide non-overlapping allowed times, so the receiver can acknowledge within the subsequent frame (1) successful decoding of the earlier frame, and (2) successful decoding of the subsequent frame.

15 Claims, 7 Drawing Sheets

(56) References Cited

U.S. PATENT DOCUMENTS

2009/0304024 A1* 12/2009 Jou .................. H04L 1/0025
370/465
2010/0034126 A1   2/2010 Kitazoe et al.
2010/0046542 A1   2/2010 Van Zelst et al.

FOREIGN PATENT DOCUMENTS

| | | |
|---|---|---|
| JP | 2005286432 A | 10/2005 |
| JP | 2006246027 A | 9/2006 |
| TW | 200945815 A | 11/2009 |
| TW | 201004243 A | 1/2010 |
| WO | 2004053114 A1 | 6/2004 |
| WO | 2009105611 | 8/2009 |
| WO | 2009108020 A2 | 9/2009 |
| WO | 2009157417 A1 | 12/2009 |
| WO | 2010017490 A1 | 2/2010 |
| WO | 2010022122 A1 | 2/2010 |

* cited by examiner

DELAYED AUTOMATIC REPEAT REQUEST (ARQ) ACKNOWLEDGMENT

CROSS-REFERENCE TO RELATED APPLICATION

This application claims priority from U.S. Provisional Patent Application Ser. No. 61/321,496, entitled DELAYED AUTOMATIC REPEAT REQUEST (ARQ) ACKNOWLEDGMENT, filed on Apr. 6, 2010, which is hereby incorporated by reference in its entirety.

BACKGROUND

Field

The present disclosure pertains to communications using Automatic Repeat reQuest (ARQ) methods.

Background

Wireless communications systems are widely deployed to provide various types of communication such as voice, packet data, and so on. These systems may be based on code division multiple access (CDMA), time division multiple access (TDMA), frequency division multiple access (FDMA), or other multiple access techniques. Such systems can conform to standards such as Third-Generation Partnership Project 2 (3gpp2, or "cdma2000"), Third-Generation Partnership (3gpp, or "W-CDMA"), or Long Term Evolution (LTE). In the design of such communications systems, it is desirable to maximize the capacity, or the number of users the system can reliably support, given the available resources.

In cdma20001x systems, the Supplemental Channel is typically operated at Frame Error Rate (FER) of between five and twenty percent. The high error rate is useful for increasing coverage and/or system capacity. To compensate for the relatively high FER, multiple rounds of retransmissions may be used at the Radio Link Protocol. Each round of retransmission may in turn contain multiple retransmissions. Such system configuration leads to larger average latency at the transport layer, which may translate into inferior application layer performance. Furthermore, the variance in the delivery time can cause timeouts for TCP leading to over the air retransmission of TCP window amount of data.

The apparatuses, methods, and articles of manufacture of the present patent application are directed to overcoming limitations of the prior art and providing improved Automatic Repeat reQuest (ARQ) acknowledgment of received frames.

SUMMARY

The described features generally relate to one or more improved systems, methods, apparatuses, and/or machine-readable non-transitory storage means for delayed acknowledgment of transmitted frames using ARQ.

Selected examples disclosed herein describe apparatus, methods, and/or articles of manufacture in which the acknowledgement channel of a cdma20001x communication system is used for retransmitting a frame received in error. In an example, a receiver of the system is configured to transmit an acknowledgment for a frame when the frame is decoded following receipt of the last (e.g., fifteenth) Pilot Control Group (PCG) of the same frame. The transmitter is configured to receive the acknowledgment of an earlier frame in a subsequent frame, and to (1) abort scheduling of retransmission of the earlier frame, (2) abort any previously scheduled retransmission of the earlier frame, and/or (3) signal upper communication layers that the earlier frame was received and successfully decoded at the receiver. The transmitter may also be configured to schedule retransmission of the earlier frame only in response to non-receipt of the acknowledgment of the earlier frame from the receiver during a predetermined portion of the subsequent frame. The subsequent frame may immediately follow the earlier frame. For example, during connection setup negotiation, the system can determine the values of ack_mask1 that defines allowed times for the receiver to acknowledge proper receipt (successful decoding) of the subsequent frame, and ack_mask2 that defines allowed times for the receiver to acknowledge proper receipt (successful decoding) of the earlier frame. The two mask values provide for non-overlapping allowed times, so the receiver can acknowledge within (while receiving) the subsequent frame (1) successful decoding of the earlier frame, and (2) successful decoding of the subsequent frame. A delayed ARQ mechanism can thus be provided on either or both uplink and downlink of the cdma20001x system.

The delayed ARQ mechanism may allow the cdma20001x supplemental channel to operate at higher FER with smaller performance degradation at the link layer. Higher FER operation may provide system capacity and coverage gains, reduction in unnecessary retransmissions at the higher layers such as a Radio Link Protocol (RLP) and Transmission Control Protocol (TCP), and overall increase in the air-interface and system efficiency.

In an embodiment, a wireless communication method includes these steps: (1) transmitting an earlier frame from a transmitter to a receiver using automatic repeat request (ARQ); (2) determining at the transmitter whether the receiver has acknowledged the earlier frame as received successfully before receipt by the receiver of the last slot of the earlier frame; and (3) determining at the transmitter whether the receiver has acknowledged the earlier frame as received successfully as a result of receipt by the receiver of the last slot of the earlier frame, in response to non-acknowledgement of the earlier frame as received successfully by the receiver before receipt of the last slot of the earlier frame.

In an embodiment, a wireless communication apparatus includes a transmitter configured to transmit data to a wireless device, a receiver configured to receive data from the wireless device, and a processor coupled to the transmitter and to the receiver. The receiver, the transmitter, and the processor are configured to perform the following steps: (1) transmitting an earlier frame from the wireless communication apparatus to the wireless device using automatic repeat request (ARQ); (2) determining whether the wireless device has acknowledged the earlier frame as received successfully before receipt by the wireless device of the last slot of the earlier frame; and (3) determining at the wireless communication apparatus whether the wireless device has acknowledged the earlier frame as received successfully as a result of receipt by the wireless device of the last slot of the earlier frame, in response to non-acknowledgement of the earlier frame as received successfully by the wireless device before receipt of the last slot of the earlier frame.

In an embodiment, a wireless communication method includes steps of: (i) receiving by a receiver an earlier frame sent from a transmitter using automatic repeat request (ARQ); (ii) determining at the receiver whether the earlier frame is received successfully before receipt by the receiver of the last slot of the earlier frame; and (iii) sending an acknowledgement of the earlier frame from the receiver to the transmitter, in response to the receiver (1) not receiving successfully the earlier frame before receipt by the receiver of the last slot of the earlier frame, and (2) receiving successfully the earlier frame as a result of receipt by the receiver of the last slot of the earlier frame.

In an embodiment, a wireless communication apparatus includes a transmitter configured to transmit data to a wireless device, a receiver configured to receive data from the wireless device, and a processor coupled to the transmitter and to the receiver. The receiver, the transmitter, and the processor are configured to perform the following steps: (i) receiving by the wireless communication apparatus an earlier frame sent from the wireless device using automatic repeat request (ARQ); (ii) determining at the wireless communication apparatus whether the earlier frame is received successfully before receipt by the wireless communication apparatus of the last slot of the earlier frame; and (iii) sending an acknowledgement of the earlier frame from the wireless communication apparatus to the wireless device, in response to the wireless communication apparatus (1) not receiving successfully the earlier frame before receipt by the wireless communication apparatus of the last slot of the earlier frame, and (2) receiving successfully the earlier frame as a result of receipt by the wireless communication apparatus of the last slot of the earlier frame.

In an embodiment, an article of manufacture includes at least one machine readable memory storing machine executable code. The machine executable code has instructions for performing these steps: (1) transmitting an earlier frame from a transmitter to a receiver using automatic repeat request (ARQ); (2) determining at the transmitter whether the receiver has acknowledged the earlier frame as received successfully before receipt by the receiver of the last slot of the earlier frame; and (3) determining at the transmitter whether the receiver has acknowledged the earlier frame as received successfully as a result of receipt by the receiver of the last slot of the earlier frame, in response to non-acknowledgement of the earlier frame as received successfully by the receiver before receipt of the last slot of the earlier frame.

In an embodiment, an article of manufacture includes at least one machine readable memory storing machine executable code. The machine executable code includes instructions for performing these steps: (i) receiving by a receiver an earlier frame sent from a transmitter using automatic repeat request (ARQ); (ii) determining at the receiver whether the earlier frame is received successfully before receipt by the receiver of the last slot of the earlier frame; and (iii) sending an acknowledgement of the earlier frame from the receiver to the transmitter, in response to the receiver (1) not receiving successfully the earlier frame before receipt by the receiver of the last slot of the earlier frame, and (2) receiving successfully the earlier frame as a result of receipt by the receiver of the last slot of the earlier frame.

In an embodiment, a wireless communication apparatus includes a means for transmitting data to a wireless device, a means for receiving data from the wireless device, and a means for processing coupled to the means for transmitting and to the means for receiving. The means for receiving, the means for transmitting, and the means for processing are configured to perform these steps: (1) transmitting an earlier frame from the wireless communication apparatus to the wireless device using automatic repeat request (ARQ); (2) determining whether the wireless device has acknowledged the earlier frame as received successfully before receipt by the wireless device of the last slot of the earlier frame; and (3) determining at the wireless communication apparatus whether the wireless device has acknowledged the earlier frame as received successfully as a result of receipt by the wireless device of the last slot of the earlier frame, in response to non-acknowledgement of the earlier frame as received successfully by the wireless device before receipt of the last slot of the earlier frame.

In an embodiment, a wireless communication apparatus includes a means for transmitting data to a wireless device, a means for receiving data from the wireless device, and a means for processing coupled to the means for transmitting and to the means for receiving. The means for receiving, the means for transmitting, and the means for processing are configured to perform the following steps: (i) receiving by the wireless communication apparatus an earlier frame sent from the wireless device using automatic repeat request (ARQ); (ii) determining at the wireless communication apparatus whether the earlier frame is received successfully before receipt by the wireless communication apparatus of the last slot of the earlier frame; and (iii) sending an acknowledgement of the earlier frame from the wireless communication apparatus to the wireless device, in response to the wireless communication apparatus (1) not receiving successfully the earlier frame before receipt by the wireless communication apparatus of the last slot of the earlier frame, and (2) receiving successfully the earlier frame as a result of receipt by the wireless communication apparatus of the last slot of the earlier frame.

In an embodiment, a wireless communication apparatus includes at least one processor coupled to a transmitter and a receiver. The processor is configured to perform these steps: (1) transmitting an earlier frame from the wireless communication apparatus to the wireless device using automatic repeat request (ARQ); (2) determining whether the wireless device has acknowledged the earlier frame as received successfully before receipt by the wireless device of the last slot of the earlier frame; and (3) determining at the wireless communication apparatus whether the wireless device has acknowledged the earlier frame as received successfully as a result of receipt by the wireless device of the last slot of the earlier frame, in response to non-acknowledgement of the earlier frame as received successfully by the wireless device before receipt of the last slot of the earlier frame.

In an embodiment, a wireless communication apparatus includes at least one processor coupled to a transmitter and a receiver. The processor is configured to perform the following steps: (i) receiving by the wireless communication apparatus an earlier frame sent from the wireless device using automatic repeat request (ARQ); (ii) determining at the wireless communication apparatus whether the earlier frame is received successfully before receipt by the wireless communication apparatus of the last slot of the earlier frame; and (iii) sending an acknowledgement of the earlier frame from the wireless communication apparatus to the wireless device, in response to the wireless communication apparatus (1) not receiving successfully the earlier frame before receipt by the wireless communication apparatus of the last slot of the earlier frame, and (2) receiving successfully the earlier frame as a result of receipt by the wireless communication apparatus of the last slot of the earlier frame.

In an embodiment, a wireless communication method includes these steps: receiving a first frame and a second frame sent from a transmitter to a receiver using automatic repeat request (ARQ), the second frame immediately following in time the first frame; and step for acknowledging the first frame during receipt by the receiver of slots of the second frame in response to both (1) the receiver being unable to decode the first frame from all slots of the first frame except last in time slot of the first frame, and (2) the receiver decoding the first frame as a result of receiving the last in time slot of the first frame.

In an embodiment, a wireless communication method includes transmitting a first frame and a second frame from a transmitter to a receiver using automatic repeat request (ARQ), the second frame immediately following in time the first frame; and step for preventing retransmission of the first frame during receipt by the receiver of slots of the second frame in response to both (1) the receiver being unable to decode the first frame from all slots of the first frame except last in time slot of the first frame, and (2) the receiver acknowledging the first frame as a result of receiving the last in time slot of the first frame.

Further scope of the applicability of the described methods, apparatuses, and articles of manufacture will become apparent from the following detailed description, claims, and drawings. The detailed description and specific examples, while indicating preferred examples of the disclosure and claims, are given by way of illustration only, since various changes and modifications within the spirit and scope of the description will become apparent to those skilled in the art.

DETAILED DESCRIPTION

Figure 1:
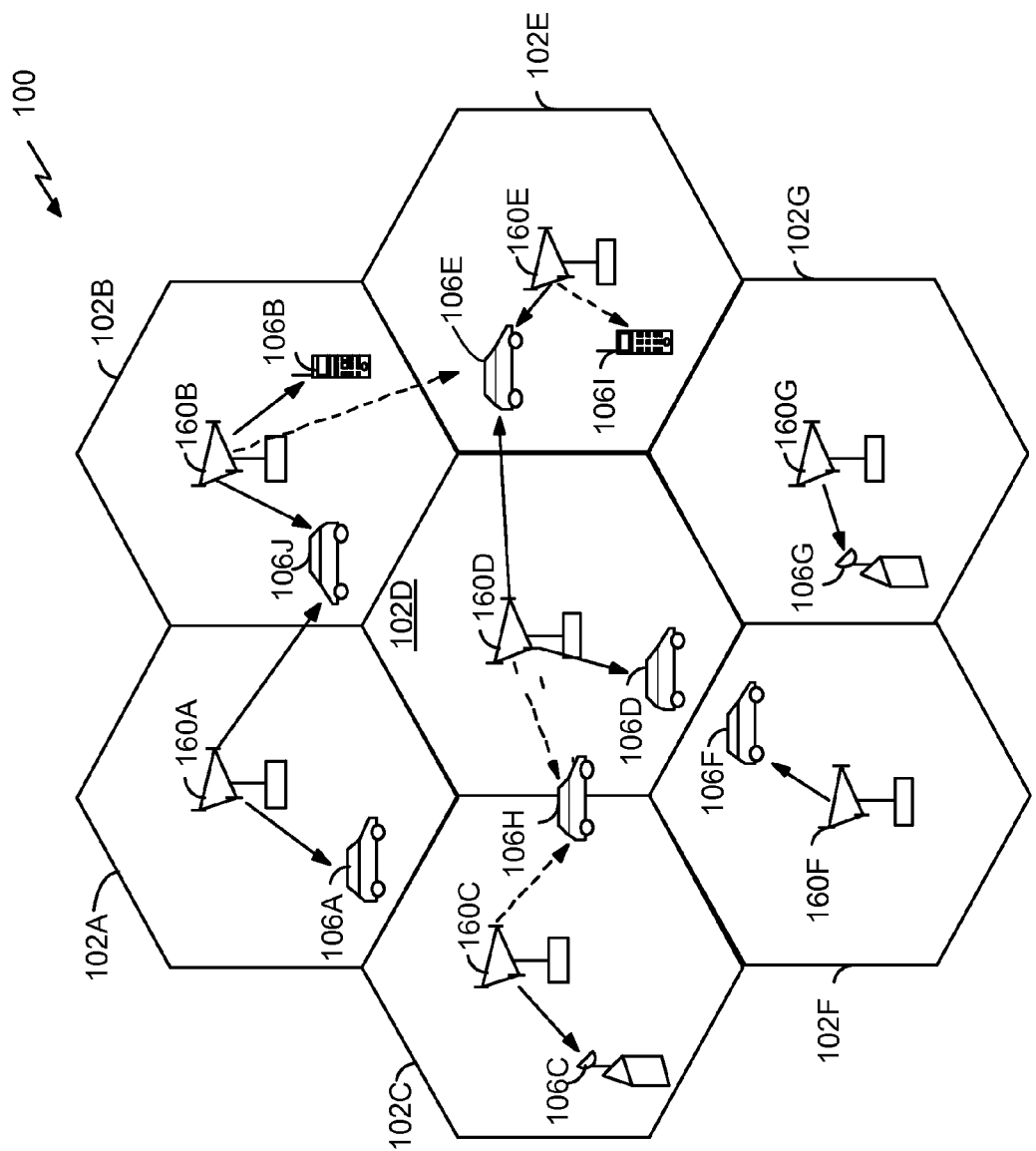
FIG. 1 is a functional block diagram of a communications system 100 where reference numerals 102A to 102G refer to cells, reference numerals 160A to 160G refer to base stations and reference numerals 106A to 106G refer to access terminals.

Certain aspects of the techniques are described in this document with reference to systems operating under cdma20001x, and consequently cdma20001x terminology may be used in the description below. But the techniques may be applicable to other standards and technologies using ARQ and similar retransmission techniques, however labeled.

The detailed description set forth below in connection with the appended drawings describes exemplary examples and does not represent the only examples that may be implemented in accordance with the principles described in this specification or are within the scope of the claims. The term "exemplary" used throughout this description means "serving as an example, instance, or illustration," and should not necessarily be construed as implying that a particular implementation is preferred or advantageous over other examples. The detailed description includes specific details for the purpose of providing a thorough understanding of the described methods and apparatuses. However, it will be apparent to those skilled in the art that the methods and apparatuses may be practiced without these specific details. In some instances, well-known structures and devices are shown in block diagram form in order to avoid obscuring the concepts of the described methods and apparatuses.

"Acknowledgement position corresponding to receipt of a slot of a frame" means the acknowledgment position of the acknowledgment channel that coincides in time with receipt of the frame.

Further described herein with reference to FIGS. 1-5 is an example of a radio network operating according to CDMA in which the principles of the present disclosure may be applied. Communication systems may use a single carrier frequency or multiple carrier frequencies. In wireless communication systems, a channel consists of a forward link (FL) for transmissions from the access network (AN) 120 to the access terminal (AT) 106, and a reverse link (RL) for transmissions from the AT 106 to the AN 120. The AT 106 is also known as a remote station, a mobile station, a subscriber station, or by a similar appellation. Also, the access terminal (AT) 106, may be mobile or stationary. Each link may incorporate a different number of carrier frequencies. Furthermore, an access terminal 106 may be any data device that communicates through a wireless channel or through a wired channel, for example using fiber optic or coaxial cables. An access terminal 106 may further be any of a number of types of devices including but not limited to PC card, compact flash, external or internal modem, or wireless or wireline phone.

A reference model for a communication system may include an access network 120 in communication with an AT 106 via an air interface. An access terminal 106 transmits and receives data packets through one or more base stations (also referred to as modem pool transceivers) 160 to an HDR base station controller 130 (also referred to as a modem pool controller 130 (MPC)), by way of the air interface. The AN 120 communicates with an AT 106, as well as any other ATs 106 within system, by way of the air interface. The communication link through which the access terminal 106 sends signals to the base station 160 is called the reverse link. The communication link through which a base station 160 sends signals to an access terminal 106 is called a forward link. Base stations 160 and base station controllers 130 are parts of an access network (AN) 120. The AN 120 includes multiple sectors, wherein each sector provides at least one channel. A channel is defined as the set of communication links for transmissions between the AN 120 and the AT's 106 within a given frequency assignment. A channel consists of a forward link for transmissions from the AN 120 to the AT 106 and a reverse link for transmissions from the AT 106 to the AN 120. The access network 120 may be further connected to additional networks 104 outside the access network 120, such as a corporate intranet or the Internet, and may transport data packets between each access terminal 106 and such outside networks 104. An access terminal 106 that has established an active traffic channel connection with one or more base stations 160 is called an active access terminal 106, and is said to be in a traffic state. An access terminal 106 that is in the process of establishing an active traffic channel connection with one or more base station controllers 130 is said to be in a connection setup state.

FIG. 1 is a simplified functional block diagram of a communications system 100 where reference numerals 102A to 102G refer to cells, reference numerals 160A to 160G refer to base stations and reference numerals 106A to 106G refer to access terminals. As stated above, a base station controller 130 can be used to provide an interface between a network 104 and all base stations 160 dispersed throughout a geographic region. For ease of explanation, only one base station 160 is shown. The geographic region is generally subdivided into smaller regions known as cells 102. Each base station 160 is configured to serve all subscriber stations 106 in its respective cell. In some high traffic applications, the cell 102 may be divided into sectors with a base station 160 serving each sector. Each subscriber station 106A-G may access the network 104, or communicate with other subscriber stations 106, through one or more base stations 160A-G under control of the base station controller 130.

Figure 2:
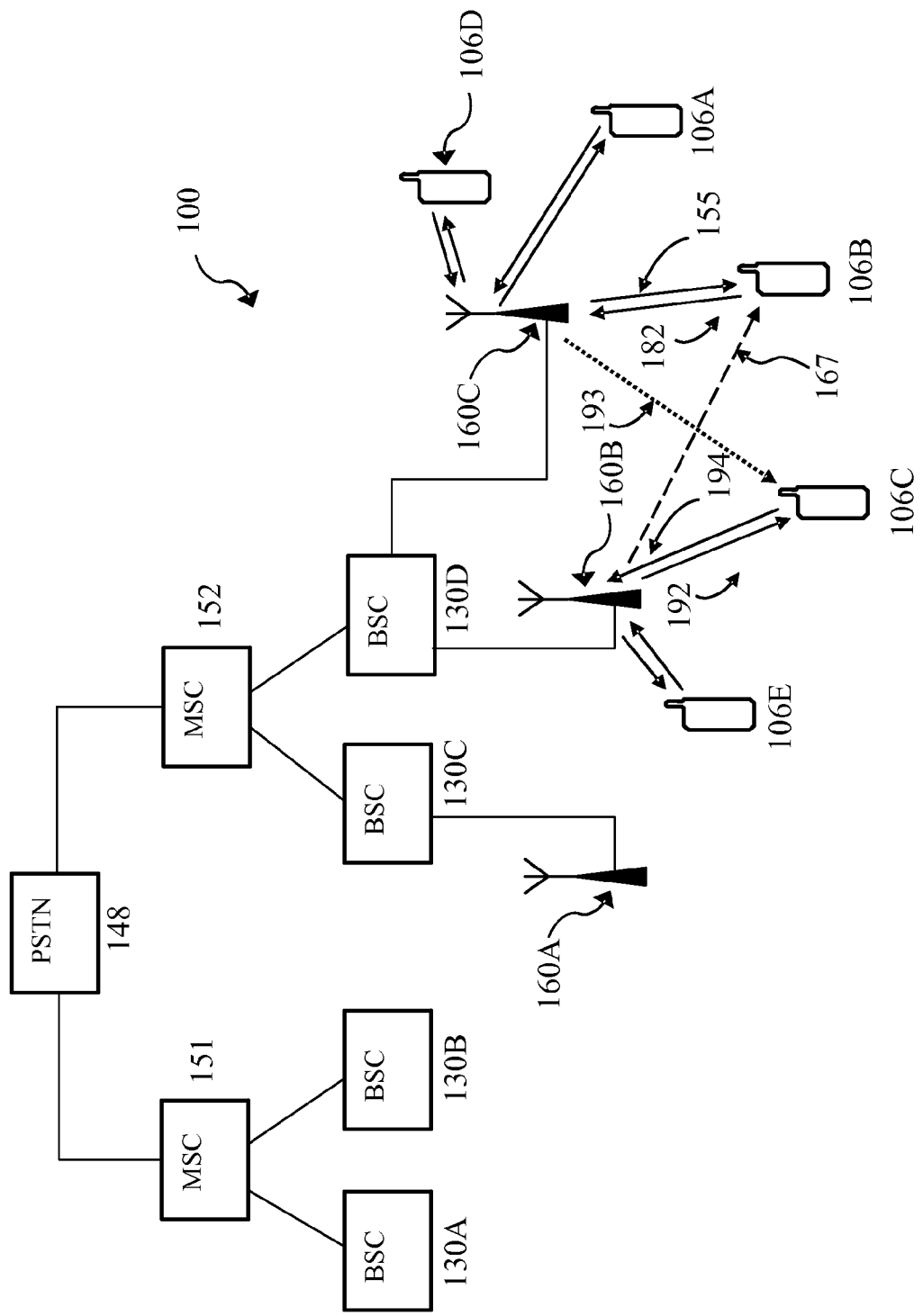
FIG. 2 illustrates selected components of a communication network 100, which includes a base station controller (BSC) 130A-D coupled to base stations or wireless base transceiver stations 160.

FIG. 2 illustrates selected components of a communication network 100, which includes a base station controller (BSC) 130A-D coupled to base stations or wireless base transceiver stations 160. The base stations 160 communicate with access terminals 106 through corresponding wireless connections 155, 167, 182, 192, 193, 194. A communications channel includes a forward link (FL) (also known as a downlink) for transmissions from the base station 160 to the AT 106, and a reverse link (RL) (also known as an uplink) for transmissions from the AT 106 to the base station 160. The BSC 130A-D provides control functionalities for one or more base stations 160. The base station controller 130A-D is coupled to a public switched telephone network (PSTN) 148 through a mobile switching center (MSC) 151, 152. In another example, the base station controller 130A-D is coupled to a packet switched network (PSN) (not shown) through a packet data server node (PDSN) (not shown). Data interchange between various network elements, such as the base station controller 130A-D and a packet data server node, can be implemented using any number of protocols, for example, the Internet Protocol (IP), an asynchronous transfer mode (ATM) protocol, T1, E1, frame relay, and other protocols.

The BSC 130A-D fills multiple roles. First, it may control the admission of new mobiles or services attempting to use the base station 160. Second, from the base station's 160 point of view, the BSC 130A-D is a controlling BSC. Controlling admission ensures that access terminals 106 are allocated radio resources (bandwidth and signal/noise ratio) up to what the network has available. From the AT's point of view, the BSC 130A-D acts as a serving BSC in which it terminates the AT 106's link layer communications. The serving BSC also controls the admission of new ATs or services attempting to use the core network.

The forward link uses the Walsh code for channelizing individual users of a particular base station 160. The IS-95 CDMA system uses 64 Walsh functions which are orthogonal to each other (i.e., their cross-product is equal to zero), and each of the logic channels on the forward link is identified by its assigned Walsh function. The Walsh function is used to generate a code which is used to separate individual users occupying the same RF band to avoid mutual interference on the forward link. Thus, the Walsh code is an orthogonal code that facilitates uniquely identifying individual communication channels. In addition, the forward link also uses the pseudorandom noise (PN) code. Each base station is assigned a unique PN code that is superimposed on top of the Walsh code. This is done to provide isolation among the different base stations (or sectors); the isolation is used because each base station uses the same 64 Walsh code set. The PN code used on the forward link is called the "short" code.

Current CDMA standards such as IS-2000 and IS-95 utilize a chip level scrambling code incorporating unique shifts in a long code to distinguish which of multiple reverse link access terminals 106 is transmitting to the base station 160. According to this scheme, the channels can not be defined so that they are orthogonal with respect to each other. Systems, such as those defined by the CDMA standard, differentiate base stations 160 using a unique PN code for each, known as a primary scrambling code. In IS-95 CDMA, the reverse link uses "long" PN code for channelization. Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate. Inherent in the design of direct sequence CDMA systems is the requirement that a receiver aligns its PN sequences to those of the base station 160.

Modern communications systems are designed to allow multiple users to access a common communications medium. Numerous multiple-access techniques are known in the art, such as time division multiple-access (TDMA), frequency division multiple-access (FDMA), space division multiple-access, polarization division multiple-access, code division multiple-access (CDMA), and other similar multi-access techniques. The multiple-access concept is a channel allocation methodology which allows multiple user access to a common communications link. The channel allocations can take on various forms depending on the specific multi-access technique. By way of example, in FDMA systems, the total frequency spectrum is divided into a number of smaller sub-bands and each user is given its own sub-band to access the communications link. Alternatively, in TDMA systems, each user is given the entire frequency spectrum during periodically recurring time slots. In CDMA systems, each user is given the entire frequency spectrum for all of the time but distinguishes its transmission through the use of a code.

Figure 3:
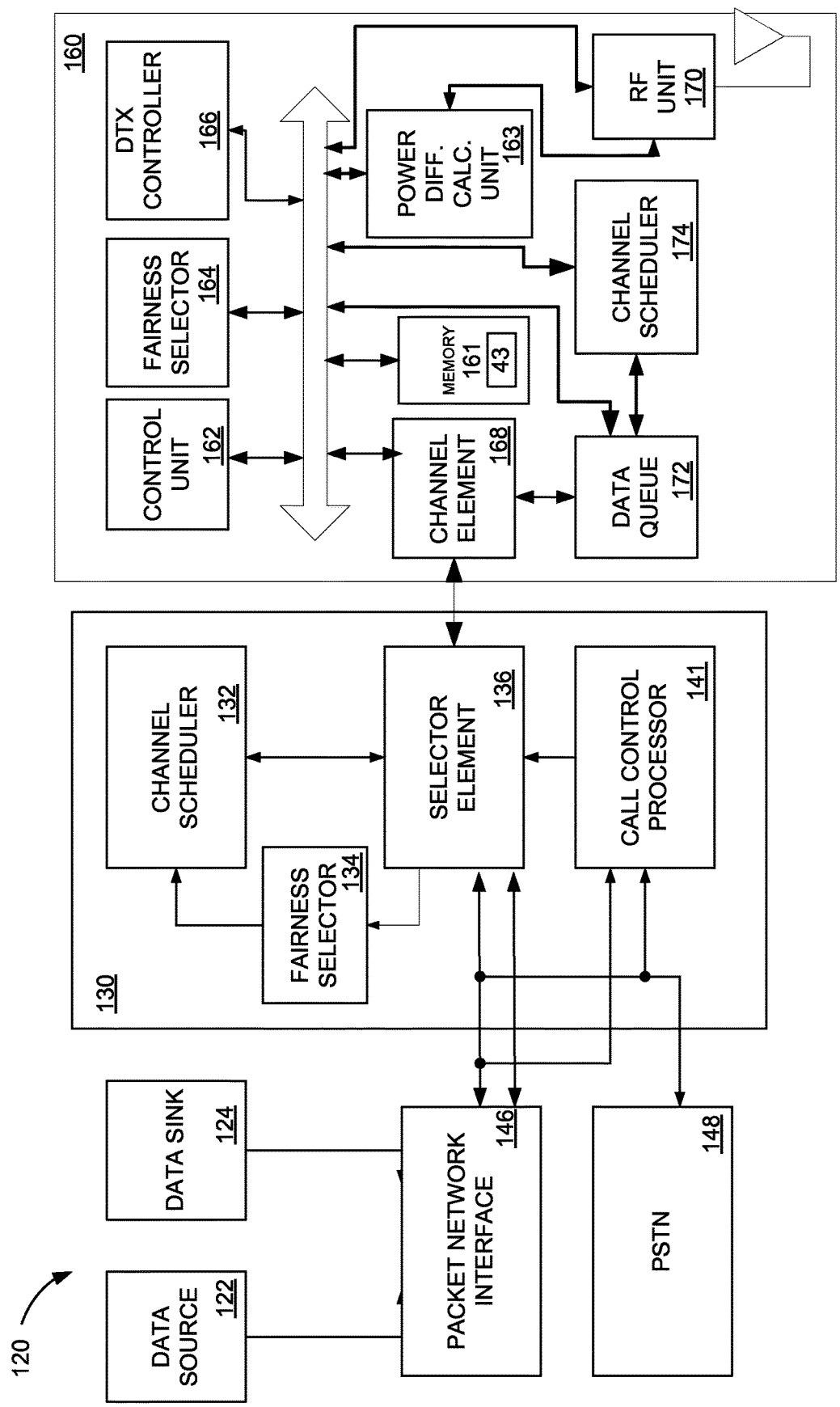
FIG. 3 illustrates a base station 160 and base station controller 130 interfaced with a packet network interface 146 and a PSTN 148.

One example of a communication system supporting high data rate (HDR) transmissions and adapted for scheduling transmissions to multiple users is illustrated in FIG. 3. FIG. 3 is detailed hereinbelow, wherein specifically, a base station 160 and base station controller 130 interface with a packet network interface 146. Base station controller 130 includes a channel scheduler 132 for implementing a scheduling algorithm for transmissions in system 120. The channel scheduler 132 determines the length of a service interval during which data is to be transmitted to any particular remote station based upon the remote station's associated instantaneous rate for receiving data (as indicated in the most recently received DRC signal, for example). The service interval may not be contiguous in time but may occur once every n slots. According to one example, the first portion of a packet is transmitted during a first slot at a first time and the second portion is transmitted 4 slots later at a subsequent time. Also, any subsequent portions of the packet are transmitted in multiple slots having a similar 4 slots spread, i.e., 4 slots apart from each other. The instantaneous rate of receiving data Ri determines the service interval length Li associated with a particular data queue.

In addition, the channel scheduler 132 selects the particular data queue for transmission. The associated quantity of data to be transmitted is then retrieved from a data queue 172 and provided to the channel element 168 for transmission to the remote station associated with the data queue 172. As discussed below, the channel scheduler 132 selects the queue for providing the data, which is transmitted in a following service interval using information including the weight associated with each of the queues. The weight associated with the transmitted queue is then updated.

Base station controller 130 interfaces with packet network interface 146, Public Switched Telephone Network (PSTN) 148, and all base stations in the communication system (only one base station 160 is shown in FIG. 3 for simplicity). Base station controller 130 coordinates the communication between remote stations in the communication system and other users connected to packet network interface 146 and PSTN 148. PSTN 148 interfaces with users through a standard telephone network (not shown in FIG. 3).

Base station controller 130 contains many selector elements 136, although only one is shown in FIG. 3 for simplicity. Each selector element 136 is assigned to control communication between one or more base stations 160 and one remote station (not shown). If selector element 136 has not been assigned to a given remote station, call control processor 141 is informed of the need to page the remote station. Call control processor 141 then directs base station 160 to page the remote station.

Data source 122 contains a quantity of data, which is to be transmitted to a given remote station. Data source 122 provides the data to packet network interface 146. Packet network interface 146 receives the data and routes the data to the selector element 136. Selector element 136 then transmits the data to each base station 160 in communication with the target remote station 106. In one example, each base station 160 maintains a data queue 172, which stores the data to be transmitted to the remote station 106.

The data is transmitted in data packets from data queue 172 to channel element 168. On the forward link, a "data packet" refers to a quantity of data which may be a maximum of 1024 bits and a quantity of data to be transmitted to a destination remote station within a predetermined "time slot" (such as ≈1.667 msec). For each data packet, channel element 168 inserts the control fields. In one example, channel element 168 performs a Cyclic Redundancy Check, CRC, encoding of the data packet and control fields and inserts a set of code tail bits. The data packet, control fields, CRC parity bits, and code tail bits comprise a formatted packet. The channel element 168 then encodes the formatted packet and interleaves (or reorders) the symbols within the encoded packet. The interleaved packet is covered with a Walsh code, and spread with the short PNI and PNQ codes. The spread data is provided to RF unit 170 which quadrature modulates, filters, and amplifies the signal. The forward link signal is transmitted over the air through an antenna to the forward link.

At the remote station 106, the downlink link signal is received by an antenna and routed to a receiver. The receiver filters, amplifies, quadrature demodulates, and quantizes the signal. The digitized signal is provided to a demodulator (DEMOD) where it is despread with the short PNI and PNQ codes and decovered with the Walsh cover. The demodulated data is provided to a decoder which performs the inverse of the signal processing functions done at base station 160, specifically the de-interleaving, decoding, and CRC check functions. The decoded data is provided to a data sink.

The DRC signal transmitted by each remote station 106 travels through a reverse link channel and is received at base station 160 through a receive antenna coupled to RF unit 170. The DRC information is demodulated in channel element 168 and provided to a channel scheduler 132 located in the base station controller 130 or to a channel scheduler 174 located in the base station 160. In one example, the channel scheduler 174 is located in the base station 160. In another example, the channel scheduler 132 is located in the base station controller 130, and connects to all selector elements 136 within the base station controller 130.

Figure 4:
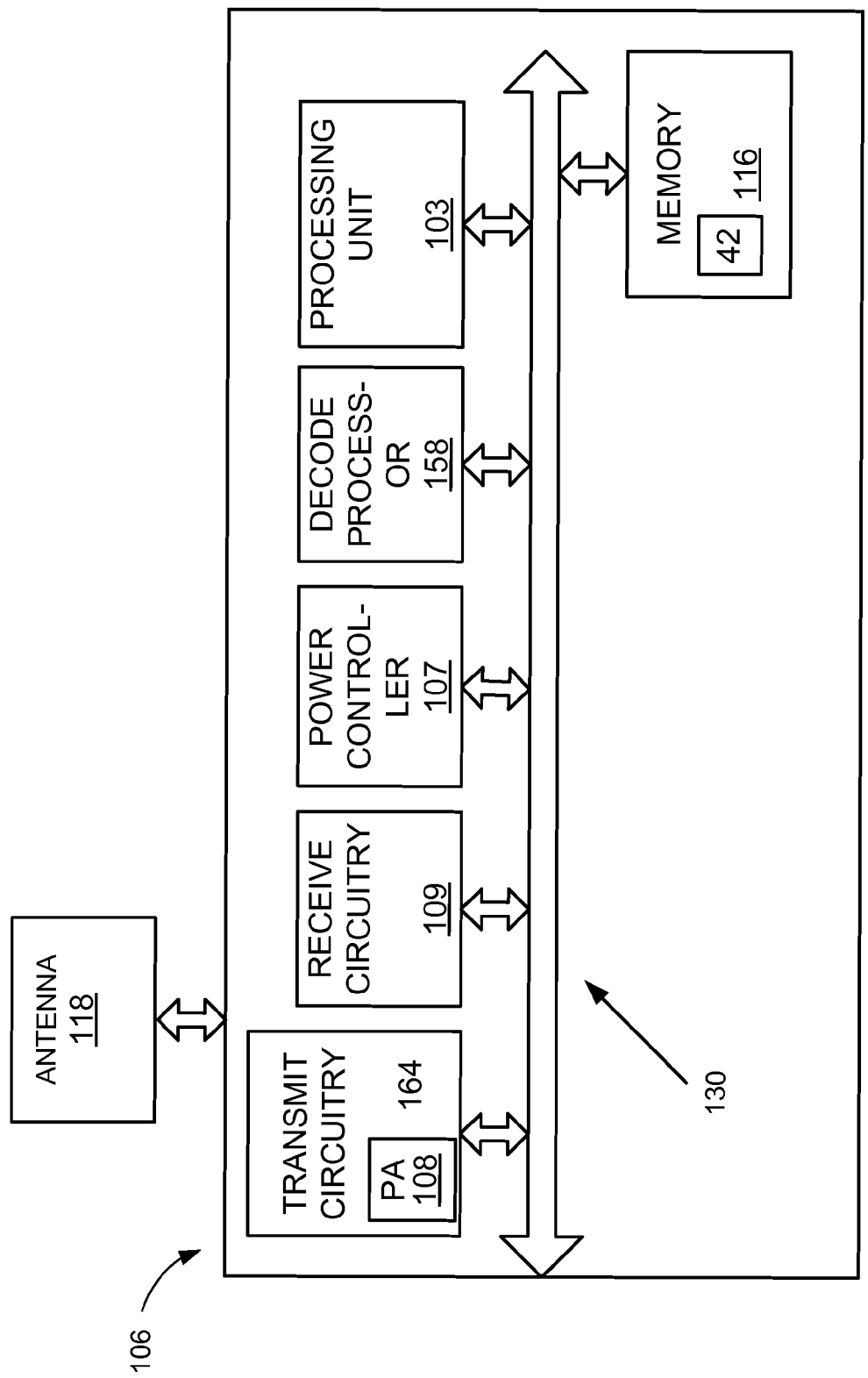
FIG. 4 illustrates an example of an AT 106 in which the AT 106 includes transmit circuitry 164 (including power amplifier (PA) 108), receive circuitry 109, power controller 107, decode processor 158, processing unit 103 for use in processing signals, and memory 116.

FIG. 4 illustrates another example of an AT 106 in which the AT 106 includes transmit circuitry 164 (including power amplifier (PA) 108), receive circuitry 109, power controller 107, decode processor 158, processing unit 103 for use in processing signals, and memory 116.

The processing unit 103 controls operation of the AT 106. The processing unit 103 may also be referred to as a CPU. Memory 116, which may include both read-only memory (ROM) and random access memory (RAM), provides instructions and data to the processing unit 103. A portion of the memory 116 may also include non-volatile random access memory (NVRAM).

The transmit circuitry 164 and a receive circuitry 109 allow transmission and reception of data, such as audio communications, between the AT 106 and a remote location. The transmit circuitry 164 and receive circuitry 109 may be coupled to an antenna 118.

The various components of the AT 106 are coupled together by a bus system 130 which may include a power bus, a control signal bus, and a status signal bus, in addition to a data bus. For the sake of clarity, the various busses are illustrated in FIG. 4 as the bus system 130.

The steps of the methods discussed may also be stored as instructions in the form of software or firmware 43 located in memory 161 in the base station 160 as shown in FIG. 3. These instructions may be executed by the control unit 162 of the base station 160 in FIG. 3. Alternatively, or in conjunction, the steps of the methods discussed may be stored as instructions in the form of software or firmware 42 located in memory 116 in the AT 106. These instructions may be executed by the processing unit 103 of the AT 106 in FIG. 4.

Figure 5:
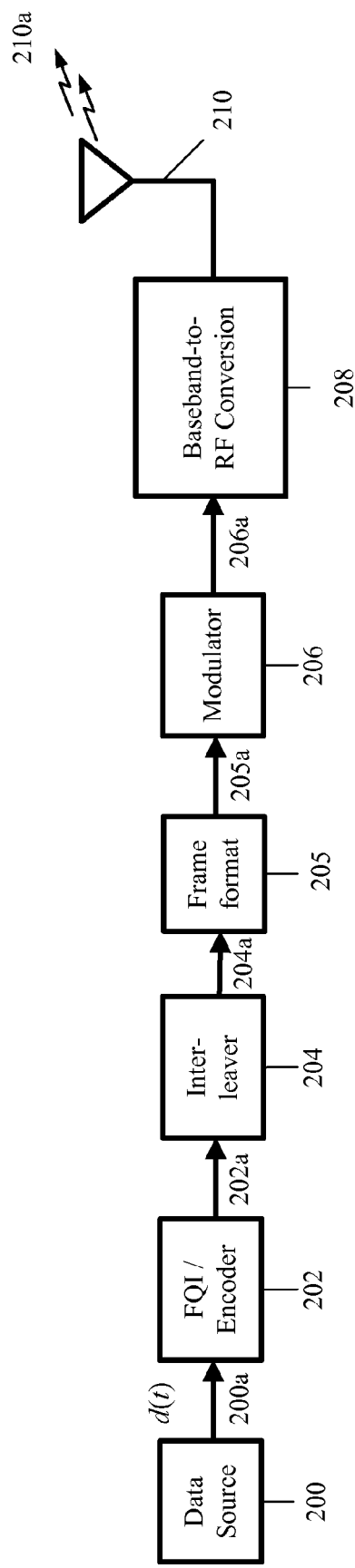
FIG. 5 illustrates an example of a transmitter structure and/or process, which may be implemented, e.g., at user equipment 123-127.

FIG. 5 illustrates an example of a transmitter structure and/or process, which may be implemented, e.g., at user equipment 123-127. The functions and components shown in FIG. 5 may be implemented by software, hardware, or a combination of software and hardware. Other functions may be added to FIG. 5 in addition to or instead of the functions shown in FIG. 5.

In FIG. 5, a data source 200 provides data d(t) or 200a to an FQI/encoder 202. The FQI/encoder 202 may append a frame quality indicator (FQI) such as cyclic redundancy check (CRC) to the data d(t). The FQI/encoder 202 may further encode the data and FQI using one or more coding schemes to provide encoded symbols 202a. Each coding scheme may include one or more types of coding, e.g., convolutional coding, Turbo coding, block coding, repetition coding, other types of coding, or no coding at all. Other coding schemes may include automatic repeat request (ARQ), hybrid ARQ (H-ARQ), and incremental redundancy repeat techniques. Different types of data may be encoded with different coding schemes.

An interleaver 204 interleaves the encoded data symbols 202a in time to combat fading, and generates symbols 204a. The interleaved symbols of signal 204a may be mapped by a frame format block 205 to a pre-defined frame format to produce a frame 205*a*. In one example, a frame format may specify the frame as being composed of a plurality of sub-segments. Sub-segments may be any successive portions of a frame along a given dimension, e.g., time, frequency, code, or any other dimension. A frame may be composed of a fixed plurality of such sub-segments, each sub-segment containing a portion of the total number of symbols allocated to the frame. For example, according to the W-CDMA standard, a sub-segment may be defined as a slot. According to the cdma2000 standard, a sub-segment may be defined as a power control group (PCG). In one example, the interleaved symbols 204*a* are segmented into a plurality S of sub-segments making up a frame 205*a*.

A frame format may further specify the inclusion of, e.g., control symbols (not shown) along with the interleaved symbols 204*a*. Such control symbols may include, e.g., power control symbols, frame format information symbols, etc.

A modulator 206 modulates the frame 205*a* to generate modulated data 206*a*. Examples of modulation techniques include binary phase shift keying (BPSK) and quadrature phase shift keying (QPSK). The modulator 206 may also repeat a sequence of modulated data.

A baseband-to-radio-frequency (RF) conversion block 208 may convert the modulated signal 206*a* to RF signals for transmission via an antenna 210 as signal 210*a* over a wireless communication link to one or more Node B station receivers.

In revision E of the cdma20001x standard, an acknowledgement channel has been added at the physical layer. A purpose of this acknowledgement channel is to terminate the transmission of a frame once an acknowledgement is received from the receiver. Multiple, for example, sixteen, opportunities exist for early termination of frames due to successful decoding at the receiver. Early termination reduces the overall transmit power and thus increases the system capacity. There are no delayed ARQ based retransmission mechanisms available in cdma20001x. In selected examples described in this document, the acknowledgement channel is used for retransmitting a frame received in error. An error in transmission is not determined accurately when there is no mechanism available for the receiver to acknowledge the last attempt by the transmitter to transmit an earlier frame. This may be the case when there is no provision to acknowledge successful decoding of a frame following transmission of the last (e.g., fifteenth) Pilot Control Group (PCG) of the frame.

In selected examples described in this document, the receiver is configured to transmit an acknowledgement for last (e.g., fifteenth) PCG in a subsequent frame, which may be the frame immediately following the frame being acknowledged. The transmitter is configured so that, if it does not receive an acknowledgement for a frame, it may retransmit the frame during a subsequent time. Further, multiple retransmissions can be made.

In an example, a receiver of a radio frequency (RF) communication system is configured to transmit an acknowledgment for a frame when the frame is decoded following receipt of the last (e.g., fifteenth) Pilot Control Group (PCG) of the same frame. The transmitter is configured to receive the acknowledgment of an earlier frame in a subsequent frame, and in response to the receipt of the acknowledgement to (1) abort scheduling of retransmission of the earlier frame, (2) abort any scheduled retransmission of the earlier frame, and/or (3) signal upper communication layer(s) (above the physical layer) that the earlier frame was received and successfully decoded at the receiver. The transmitter may also be configured to schedule retransmission of the earlier frame only in response to non-receipt of the acknowledgment of the earlier frame from the receiver during a predetermined portion of the subsequent frame. The subsequent frame may immediately follow the earlier frame. For example, during connection setup negotiation, the system can determine the values of ack_mask1 that defines allowed times for the receiver to acknowledge proper receipt (successful decoding) of the subsequent frame, and ack_mask2 that defines allowed times for the receiver to acknowledge proper receipt (successful decoding) of the earlier frame. The two mask values provide for non-overlapping allowed times, so the receiver can acknowledge within the subsequent frame (1) successful decoding of the earlier frame, and (2) successful decoding of the subsequent frame.

Figure 6:
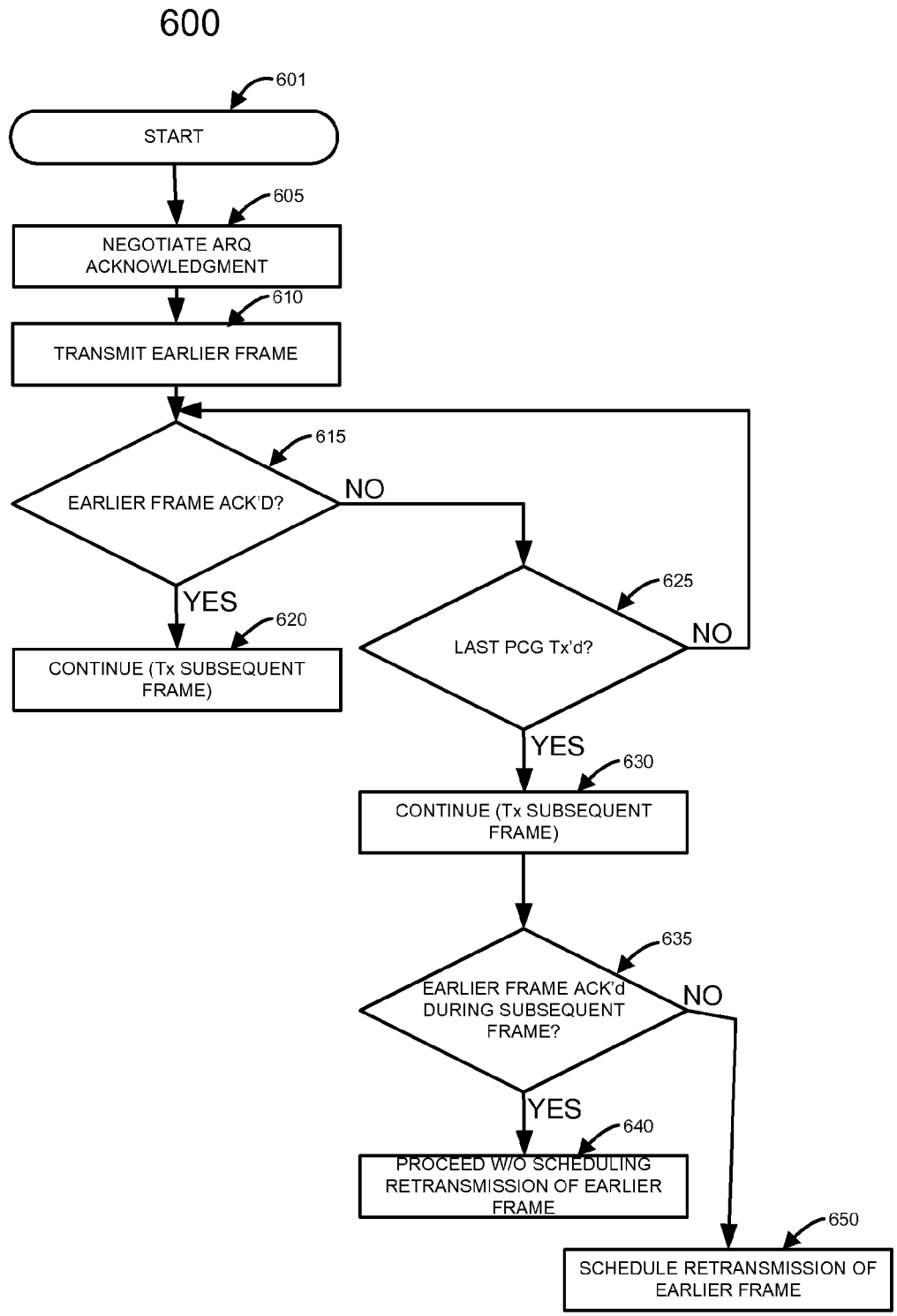
FIG. 6 illustrates selected steps and decision blocks of a process performed by a transmitter of a communication system using ARQ.

FIG. 6 illustrates selected steps and decision blocks of an exemplary process 600 performed by a transmitter of a communication system using ARQ.

At flow point 601, the transmitter has been powered up and configured for communication with a receiver.

In step 605, the transmitter negotiates with the receiver connection parameters, including two masks: (1) a first ack_mask that defines allowed times for the receiver to acknowledge proper receipt (successful decoding) of the current (i.e., subsequent) frame, and (2) a second ack_mask that defines allowed times for the receiver to acknowledge proper receipt (successful decoding) of an earlier frame, for example, an immediately preceding frame. Tables 1 and 2 below show an example of the two masks where the receiver (1) can acknowledge the current frame in response to successful decoding of the current frame following receipt of one of the PCGs of the current frame, and (2) can acknowledge the earlier frame in response to successful decoding of the earlier frame following receipt of the last (e.g., fifteenth) PCG of the earlier frame. In the tables, the top row shows positions in the corresponding mask, a "1" in the lower row indicates availability of the position on the acknowledgement channel, and a "0" in the lower row indicates unavailability of the position. Thus, the receiver can acknowledge proper receipt of two frames within one frame, i.e., proper receipt of the same frame during which the acknowledgments are made, and also proper receipt of a previous frame.

TABLE 1

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 0 | 0 | 0 | 0 | 0 | 1 | 1 | 1 | 1 | 1 | 1  | 1  | 1  | 1  | 1  | 1  |

TABLE 2

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | 1 | 1 | 1 | 1 | 0 | 0 | 0 | 0 | 0 | 0  | 0  | 0  | 0  | 0  | 0  |

Note that these are merely examples and other mask values can be employed as long as a position does not indicate acknowledgement for more than one of the frames. Also, the respective meanings of 1's and 0's may be reversed, i.e., with 1's signifying unavailability and 0's signifying availability of the position for acknowledgment of the particular frame. Note also that not all of the positions are necessarily dedicated to acknowledgement of two frames. For example, some of the positions may be made unavailable for acknowledgment of either frame. Further, it may be possible to extend the scheme to acknowledgment of more than two frames within a single frame.

In step 610, the transmitter transmits a first (earlier) frame using a plurality (e.g., sixteen) PCGs or slots.

In decision block 615, the transmitter tests whether the earlier frame has been acknowledged. For example, the transmitter looks for acknowledgement of the earlier frame in the PCG positions 5-15 of the earlier frame, in accordance with Table 1. If the frame has been acknowledged, the transmitter proceeds with transmission of a subsequent frame, in step 620.

Otherwise, process flow continues to decision block 625 in which the transmitter determines whether the last PCG of the earlier frame has been transmitted. If not, the process flow loops back to the decision block 615, continuing to transmit the PCG(s) of the earlier frame.

If the last PCG of the earlier frame has been transmitted without acknowledgement, as determined in the decision block 625, the transmitter proceeds to transmit PCGs of the subsequent frame, in step 630.

In decision block 635 (which follows the step 630), the transmitter determines whether the earlier frame has been acknowledged during the subsequent frame. For example, the transmitter looks for acknowledgement of the earlier frame in the PCG positions 0-4 of the subsequent frame, in accordance with Table 2.

If the earlier frame has been acknowledged, the transmitter does not schedule retransmission of the earlier frame (or cancels scheduled retransmission of the earlier frame) and proceeds with the transmission of the subsequent frame; this is generally indicated by steps 640. If the earlier frame has not been acknowledged, the transmitter continues with the transmission of the subsequent frame and schedules retransmission of the earlier frame (or does not cancel scheduled retransmission of the earlier frame, if such retransmission has already been scheduled); this is generally indicated by steps 650. Note that the transmitter need not wait until the end of the transmission of the subsequent block to make the determination of the block 635, but can do so after receipt of the last position of the acknowledgement channel in which the earlier frame can be acknowledged, as was negotiated in the step 605. Consistent with the tables 1 and 2, the determination can be made after receipt of position four of the acknowledgement indication on the acknowledgement channel.

The process may then be repeated for transmission of other frames, as needed.

Figure 7:
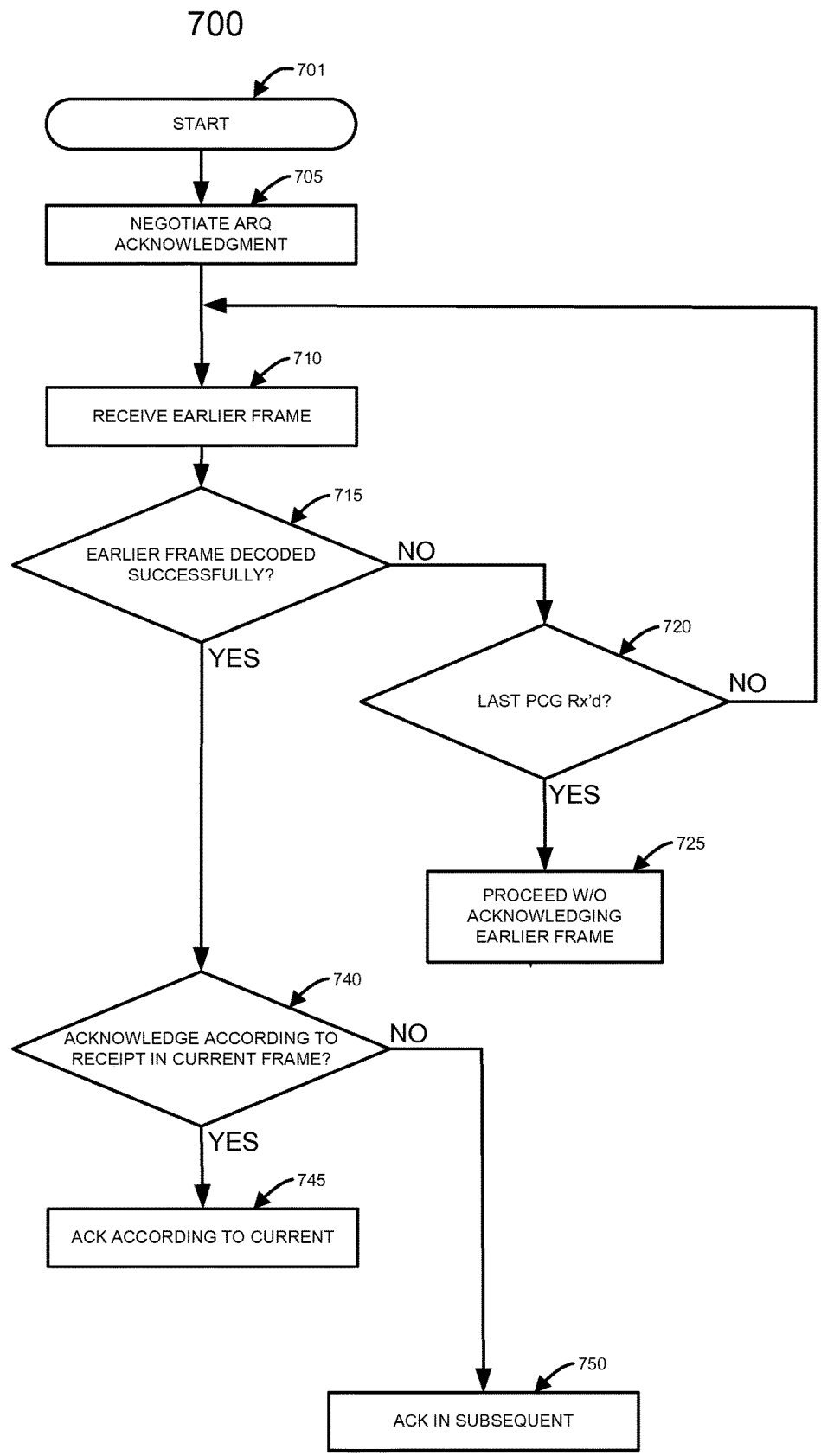
FIG. 7 illustrates selected steps and decisions of a process performed by a receiver of a communication system using ARQ.

FIG. 7 illustrates selected steps and decision blocks of an exemplary process 700 performed by the receiver of the communication system, which is communicating with the transmitter.

At flow point 701, the receiver has been powered up and configured for communication with the transmitter.

In step 705, the receiver negotiates with the transmitter the connection parameters, including the two masks, as has been described above in relation to the step 605.

In step 710, the receiver receives the earlier frame. In particular, the receiver attempts to decode the frame following the receipt of each PCG (or "slot") of the earlier frame.

In decision block 715, the receiver determines whether the earlier frame has been decoded successfully. If the earlier frame has not been decoded successfully, the receiver determines, in decision block 720, whether the last PCG/slot of the earlier frame has been received. If the last PCG/slot of the earlier frame has been received, process flow continues to steps 725, for example, to receive the subsequent slot; no acknowledgement of the earlier slot is sent. If the last PCG has not been received, process flow returns to the step 710 to continue receiving the earlier slot.

If the receiver determines in the decision block 715 that the earlier frame has been decoded successfully, the receiver sends an acknowledgement of the earlier frame in accordance with the negotiated parameters, including the masks such as those shown in Tables 1 and 2. In particular, process flow proceeds from the affirmative determination of the decision block 715 to decision block 740. In the decision block 740, the receiver determines whether it can still send an acknowledgement of the earlier frame in accordance with Table 1 (for example, in the positions 5-15 of the frame being acknowledged). If so, in step 745 it sends the acknowledgement of the earlier frame in the acknowledgement transmission corresponding to the earlier frame. If the acknowledgment cannot be sent in the acknowledgement transmission corresponding to the earlier frame, as determined in the decision block 740 but can still be sent in the acknowledgment transmission corresponding to the subsequent frame, in step 750 the receiver sends the acknowledgement of the earlier frame in the acknowledgement transmission corresponding to the subsequent frame, for example, in accordance with Table 2.

The process may then be repeated for receipt of other frames, as needed.

The frames (both or either the earlier and the subsequent frame) can carry traffic information, such as audio and or visual information. The traffic information in the frame(s) can be rendered (e.g., displayed and/or sounded) to a user of the receiver.

Although steps and decision blocks of various methods may have been described serially in this disclosure, some of these steps and decisions may be performed by separate elements in conjunction or in parallel, asynchronously or synchronously, in a pipelined manner, or otherwise. There is no particular requirement that the steps and decisions be performed in the same order in which this description lists them and the accompanying Figures show them, except where explicitly so indicated, otherwise made clear from the context, or inherently required. It should be noted, however, that in selected variants the steps and decisions are performed in the particular progressions described above and/or shown in the accompanying Figures. Furthermore, not every illustrated step and decision may be required in every variant, while some steps and decisions that have not been specifically illustrated may be desirable or necessary in some variants.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure and claims.

Various illustrative logical blocks, modules, and circuits described in connection with the examples disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium. A storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary examples, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Storage media may be any available non-transitory media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description is provided to enable any person skilled in the art to make or use the disclosed methods and apparatuses. Various modifications to these methods and apparatuses will be readily apparent to those skilled in the art, and the generic principles defined herein may be applied to other examples without departing from the spirit or scope of the description or claims. Thus, the claims are not intended to be limited to the examples shown herein but are to be accorded the widest scope consistent with the principles and novel features disclosed herein.

What is claimed is:

1. A wireless communication method comprising:
   receiving by a receiver device an earlier frame sent from a transmitter device during an earlier frame, time period using automatic repeat request (ARQ);
   determining at the receiver device during, a current frame time period subsequent to the earlier frame time period whether the earlier frame is received successfully;
   determining at the receiver device during the current frame time period whether the receiver device is permitted to send acknowledgement of the earlier frame during the current frame time period based on a set of current frame and subsequent frame allowed and unavailable acknowledgement times maintained at the receiver device;
   if the receiver device is permitted to send acknowledgement of the earlier frame during the current frame time period, sending an acknowledgement of the earlier frame from the receiver device to the transmitter device during the current frame time period at a current frame allowed acknowledgement time; and
   if the receiver device is not permitted to send acknowledgement of the earlier frame during the current frame time period, sending an acknowledgement of the earlier frame from the receiver device to the transmitter device during a subsequent frame time period at a subsequent frame allowed acknowledgement time;
   wherein the receiver and the transmitter further negotiating ARQ acknowledgement parameters, the ARQ acknowledgement parameters including:
   a first mask indicating the one or more positions reserved for acknowledging successful receipt of the earlier frame, and a second mask indicating the one or more positions reserved for acknowledging successful receipt of the subsequent frame, the one or more positions reserved for acknowledging successful receipt of the earlier frame not overlapping with the one or more positions reserved for acknowledging successful receipt of the subsequent frame.

2. The wireless communication method of claim 1, further comprising:
   receiving a subsequent frame sent from the transmitter device using ARQ; and
   negotiating with the transmitter device ARQ acknowledgement parameters, the ARQ acknowledgement parameters indicating availability of acknowledgement positions of an acknowledgement channel, wherein each acknowledgement position corresponds to receipt by the receiver device of the subsequent frame being reserved for acknowledging successful receipt of the earlier frame or for acknowledging successful receipt of the subsequent frame, the subsequent frame following in time the earlier frame, one or more of the acknowledgment positions corresponding to receipt by the receiver device of the subsequent frame being reserved for acknowledging successful receipt of the earlier frame, and one or more of the acknowledgment positions corresponding to receipt by the receiver device of the subsequent frame being reserved for acknowledging successful receipt of the subsequent frame, each frame comprising a plurality of N slots, N being a predetermined number, wherein acknowledgment of successful receipt of both the earlier frame and the subsequent frame by the receiver device is indicated at a particular acknowledgement position corresponding to receipt of the subsequent frame.

3. The wireless communication method of claim 1, further comprising:
receiving the subsequent frame sent from the transmitter device using ARQ, the subsequent frame immediately following the earlier frame.

4. The wireless communication method of claim 1, wherein each frame comprises sixteen slots.

5. The wireless communication method of claim 1, further comprising receiving subsequent frame sent using ARQ;
wherein at least one of the earlier frame and the subsequent frame includes audio information or visual information.

6. The wireless communication method of claim 5, further comprising rendering the audio information or visual information by the receiver device, wherein the receiver device is a mobile station and the transmitter device is a base transceiver station.

7. A wireless communication apparatus comprising:
a transmitter configured to transmit data to a wireless device;
a receiver configured to receive data from the wireless device; and
a processor coupled to the transmitter and to the receiver;
wherein the processor is configured to: enable the receiver to receive an earlier frame sent from the wireless device during an earlier frame dine period using automatic repeat request (ARQ);
determine during a current frame time period whether the earlier frame is received successfully;
determine during the current frame time period whether the receiver is permitted to send acknowledgement of the earlier frame during the current frame time period based on a set of current frame and subsequent frame allowed and unavailable acknowledgement times maintained at the receiver;
when the receiver is permitted to send acknowledgement of the earlier frame during the current frame time period, enable the receiver to send an acknowledgement of the earlier frame to the wireless device during the current frame time period at a current frame allowed acknowledgement time; and
when the receiver is not permitted to send acknowledgement of the earlier frame during the current frame time period, enable the receiver to send an acknowledgement of the earlier frame from the receiver to the wireless device during a subsequent frame time period at a subsequent frame allowed acknowledgement time;

wherein the processor is further configured to enable the receiver to negotiate ARQ acknowledgement parameters, the ARQ acknowledgement parameters including:
a first mask indicating the one or more positions reserved for acknowledging successful receipt of the earlier frame, and a second mask indicating the one or more positions reserved for acknowledging successful receipt of the subsequent frame, the one or more positions reserved for acknowledging successful receipt of the earlier frame not overlapping with the one or more positions reserved for acknowledging successful receipt of the subsequent frame.

8. The wireless communication apparatus of claim 7, wherein the processor is further configured to:
enable the receiver to receive the subsequent frame sent from the wireless device using ARQ; and
negotiate with the wireless device ARQ acknowledgement parameters, the ARQ acknowledgement parameters indicating availability of acknowledgement positions of an acknowledgement channel, each acknowledgement position corresponding to receipt of the subsequent frame being reserved for acknowledging successful receipt of the earlier frame or for acknowledging successful receipt of the subsequent frame, the subsequent frame following in time the earlier frame, one or more of the acknowledgment positions corresponding to receipt of the subsequent frame being reserved for acknowledging successful receipt of the earlier frame, and one or more of the acknowledgment positions corresponding to receipt of the subsequent frame being reserved for acknowledging successful receipt of the subsequent frame, each frame comprising a plurality of N slots, N being a predetermined number, wherein acknowledgment of successful receipt of both the earlier frame and the subsequent frame is indicated in a particular acknowledgment position corresponding to receipt of the subsequent frame.

9. The wireless communication apparatus of claim 7, wherein the processor is further configured to enable the receiver to receive the subsequent frame sent from the wireless device using ARQ, the subsequent frame immediately following the earlier frame.

10. The wireless communication apparatus of claim 7, wherein each frame comprises sixteen slots.

11. The wireless communication apparatus of claim 7, wherein:
the processor is further configured enable the receiver to receive the subsequent frame sent from the wireless device using ARQ; and
at least one of the earlier frame and the subsequent frame includes audio information or visual information.

12. The wireless communication apparatus of claim 11, wherein the processor is further configured to render the audio information or visual information, the processor is included in a mobile station, and wherein the wireless device is a base transceiver station.

13. An article of manufacture comprising at least one machine readable memory, the at least one machine readable memory storing machine executable code, the machine executable code comprising instructions for:
receiving by a receiver device an earlier frame sent from a transmitter device during an earlier frame time period using automatic, repeat request (ARQ);

determining at the receiver device during a current frame time period subsequent to the earlier frame time period whether the earlier frame is received successfully;

determining at the receiver device during the current frame time period whether the receiver device is permitted to send acknowledgement of the earlier frame during the current frame time period based on a set of current frame and subsequent frame allowed and unavailable acknowledgement times maintained at the receiver device;

when the receiver device is permitted to send acknowledgement of the earlier frame during the current frame time period, sending an acknowledgement of the earlier frame from the receiver device to the transmitter device during the current frame time period at a current frame allowed acknowledgement time; and When the receiver device is not permitted to send acknowledgement of the earlier frame during the current frame time period, sending an acknowledgement of the earlier frame from the receiver device to the transmitter device during a subsequent frame time period at a subsequent frame allowed acknowledgement time;

wherein the transmitter is further configured to enable the receiver to negotiate ARQ acknowledgement parameters, the ARQ acknowledgement parameters including:

a first mask indicating the one or more positions reserved for acknowledging successful receipt of the earlier frame, and a second mask indicating the one or more positions reserved for acknowledging successful receipt of the subsequent frame, the one or more positions reserved for acknowledging successful receipt of the earlier frame not overlapping with the one or more positions reserved for acknowledging successful receipt of the subsequent frame.

14. A wireless communication apparatus comprising:
a means for transmitting data to a wireless device;
a means for receiving data from the wireless device; and
a means for processing coupled to the means for transmitting and to the means for receiving;
wherein the means for processing is configured to:
receive an earlier frame sent from the wireless device during an earlier frame time period using automatic repeat request (ARQ);
determine during a current frame time period subsequent to the earlier frame time period whether the earlier frame is received successfully;
determine during the current frame time period whether the receiver is permitted to send acknowledgement of the earlier frame during the current frame time period based on a set of current frame and subsequent frame allowed and unavailable acknowledgement times maintained at the receiver;
when the receiver is permitted to send acknowledgement of the earlier frame during the current frame time period, enable the receiver to send an acknowledgement of the earlier frame to the wireless device during the current frame time period at a current frame allowed acknowledgement time; and when the receiver is not permitted to send acknowledgement of the earlier frame during the current frame time period, enable the receiver to send an acknowledgement of the earlier frame from the receiver to the wireless device during a subsequent frame time period at a subsequent frame allowed acknowledgement time;

wherein the means for processing is further configured to enable the receiver to negotiate ARQ acknowledgement parameters, the ARQ acknowledgement parameters including:

a first mask indicating the one or more positions reserved for acknowledging successful receipt of the earlier frame, and a second mask indicating the one or more positions reserved for acknowledging successful receipt of the subsequent frame, the one or more positions reserved for acknowledging successful receipt of the earlier frame not overlapping with the one or more positions reserved for acknowledging successful receipt of the subsequent frame.

15. A wireless communication apparatus comprising:
at least one processor coupled to a transmitter and a receiver, the processor being configured to:
receive an earlier frame sent from a wireless device during an earlier frame time period using automatic repeat request (ARQ); determine during a current frame time period subsequent to the earlier frame time period Whether the earlier frame is received successfully;
determine during the current frame time period whether the receiver is permitted to send acknowledgement of the earlier frame during the current frame time period based on a set of current frame and subsequent frame allowed and unavailable acknowledgement times maintained at the receiver;
when the receiver is permitted to send acknowledgement of the earlier frame during the current frame time period, send an acknowledgement of the earlier frame, to the wireless device during the current frame time period at a current frame allowed acknowledgement time; and
when the receiver is not permitted to send acknowledgement of the earlier frame during the current frame time period, send an acknowledgement of the earlier frame to the wireless device during a subsequent frame time period at a subsequent frame allowed acknowledgement time;
wherein the processor is further configured to enable the receiver to negotiate ARQ acknowledgement parameters, the ARQ acknowledgement parameters including:
a first mask indicating the one or more positions reserved for acknowledging successful receipt of the earlier frame, and a second mask indicating the one or more positions reserved for acknowledging successful receipt of the subsequent frame, the one or more positions reserved for acknowledging successful receipt of the earlier frame not overlapping with the one or more positions reserved for acknowledging successful receipt of the subsequent frame.

* * * * *